US008266112B1

(12) United States Patent
Beatty et al.

(10) Patent No.: US 8,266,112 B1

(45) Date of Patent: Sep. 11, 2012

(54) TECHNIQUES FOR RECOVERY OF APPLICATION LEVEL OBJECTS

(75) Inventors: Louis J. Beatty, Ormond Beach, FL (US); Steven R. DeVos, Kirkland, WA (US)

(73) Assignee: Symantec Corporation, Mountain View, CA (US)

(*) Notice: Subject to any disclaimer, the term of this patent is extended or adjusted under 35 U.S.C. 154(b) by 473 days.

(21) Appl. No.: 11/960,309

(22) Filed: Dec. 19, 2007

(51) Int. Cl.
*G06F 17/30* (2006.01)

(52) U.S. Cl. ........ 707/678; 707/610; 707/640; 707/661; 707/674; 714/6; 714/14; 714/18

(58) Field of Classification Search .................. 707/200, 707/202, 204, 674, 610, 640, 661, 678; 714/6, 714/14, 18
See application file for complete search history.

(56) References Cited

U.S. PATENT DOCUMENTS

| | | | |
|---|---|---|---|
| 6,704,726 B1 * | 3/2004 | Amouroux | 1/1 |
| 7,010,144 B1 * | 3/2006 | Davis et al. | 382/100 |
| 7,350,191 B1 * | 3/2008 | Kompella et al. | 717/108 |
| 7,552,358 B1 * | 6/2009 | Asgar-Deen et al. | 714/6 |
| 7,653,668 B1 * | 1/2010 | Shelat et al. | 707/610 |
| 7,729,926 B1 * | 6/2010 | Hopwood | 705/1.1 |
| 2002/0049603 A1 * | 4/2002 | Mehra et al. | 705/1 |
| 2004/0098422 A1 * | 5/2004 | Levesque et al. | 707/203 |
| 2005/0193235 A1 * | 9/2005 | Sandorfi et al. | 714/6 |
| 2006/0117048 A1 * | 6/2006 | Thind et al. | 707/101 |
| 2006/0179082 A1 * | 8/2006 | Boyd et al. | 707/203 |
| 2006/0248038 A1 * | 11/2006 | Kaplan et al. | 707/1 |

OTHER PUBLICATIONS

Kalis, Frank. "Spotlight on ApexSQL Log: SQL Server Audit & Recovery Tool"; SQLServerPerformance.com; http://www.sql-server-performance.com/software/review/apex_log_p1.aspx; Jan. 24, 2007.

* cited by examiner

*Primary Examiner* — John E Breene
*Assistant Examiner* — Andalib Lodhi
(74) *Attorney, Agent, or Firm* — Wilmer Cutler Pickering Hale and Dorr LLP

(57) ABSTRACT

Techniques for recovery of application level objects are disclosed. In one particular exemplary embodiment, the techniques may be realized as a method for restoration of one or more application level objects. The method may comprise obtaining application metadata of an application containing objects to be restored, storing one or more data files containing application data, utilizing the application metadata to provide a user interface for the restoration of one or more application objects, accepting input from a user via the user interface specifying one or more application objects to restore, and restoring the one or more specified application objects.

20 Claims, 4 Drawing Sheets

100

Application Server 110

Recovery Manager 115

Storage 120

System Data 125

Application Data 130

Storage 135

Backup Data 140

Metadata File 145

100

400

TECHNIQUES FOR RECOVERY OF APPLICATION LEVEL OBJECTS

FIELD OF THE DISCLOSURE

The present disclosure relates generally to recovery of data and, more particularly, to techniques for recovery of application level objects.

BACKGROUND OF THE DISCLOSURE

When data is lost, users are often forced to make choices about which content to restore. Many data backup strategies now include the ability to provide point in time recovery. This may enable users to restore a system to an earlier specified point in time in order to recover data prior to its deletion. However, such backup strategies require the restoration of the entire system. Restoration of an entire system may require significant storage space, take significant time, and be costly. A point in time backup strategy or other traditional backup strategies are not practical or efficient when the only data desired for restoration is a small subset of the entire backup. Furthermore, application users who lose application data face another challenge. Frequently application data may be stored in underlying file or database systems and backups are performed at this level. Even if users are capable of restoring selected data objects from a backup, the underlying data may be stored in a format that may be meaningless to application users. Thus, it may be difficult to determine which portion of data to restore. Additionally, restoration of a subset of the underlying data in order to restore one or more application objects may not ensure compatibility with a current application. An application may make changes in formats, file dependencies or other data structures utilized in its data storage that may prohibit the restoration of one or more application objects by copying underlying files or data. Such updates or changes in applications may require a full point in time restoration in order to recover one or more lost application objects.

In view of the foregoing, it may be understood that there are significant problems and shortcomings associated with current application data recovery technologies.

SUMMARY OF THE DISCLOSURE

Techniques for recovery of application level objects are disclosed. In one particular exemplary embodiment, the techniques may be realized as a method for restoration of one or more application level objects. The method may comprise obtaining application metadata of an application containing objects to be restored, storing one or more data files containing application data, utilizing the application metadata to provide a user interface for the restoration of one or more application objects, accepting input from a user via the user interface specifying one or more application objects to restore, and restoring the one or more specified application objects.

In another particular exemplary embodiment, the techniques may be realized as an article of manufacture for restoration of one or more application level objects. The article of manufacture may comprise at least one processor readable carrier and instructions carried on the at least one carrier, wherein the instructions are configured to be readable from the at least one carrier by at least one processor and thereby cause the at least one processor to operate so as to obtain application metadata of an application containing objects to be restored, store one or more data files containing application data, utilize the application metadata to provide a user interface for the restoration of one or more application objects, accept input from a user via the user interface specifying one or more application objects to restore, and restore the one or more specified application objects.

In yet another particular exemplary embodiment, the techniques may be realized as a system for restoration of one or more application level objects. The system may comprise one or more processors communicatively coupled to a server, wherein the server is configured to obtain application metadata of an application containing objects to be restored, store one or more data files containing application data, utilize the application metadata to provide a user interface for the restoration of one or more application objects, accept input from a user via the user interface specifying one or more application objects to restore, and restore the one or more specified application objects.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
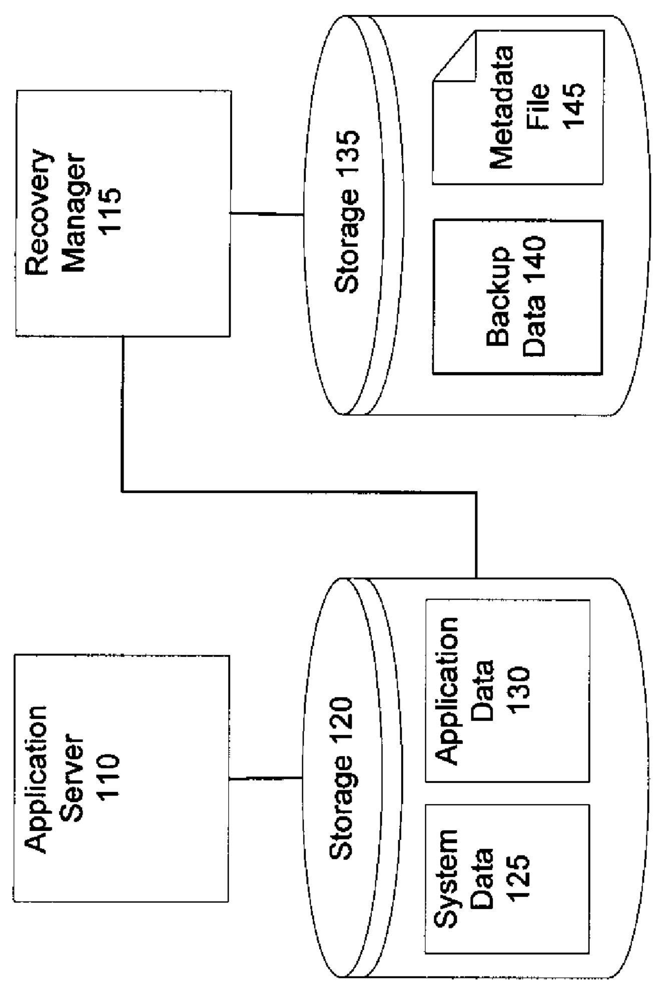
FIG. 1 shows a system for the recovery of application objects in accordance with an embodiment of the present disclosure.

Referring to FIG. 1, there is shown a system for the recovery of application objects in accordance with an embodiment of the present disclosure. Application server 110 may be a server hosting one or more applications. Storage 120 may be storage that may be utilized by application server 110 to store system data 125, application data 130, or other data. Recovery manager 115 may be a separate server, a process on the application server, or another device or process which may facilitate backup and/or recovery of application objects. Storage 135 may be storage utilized by recovery manager 115 and may enable the access and/or storage of backup data 140 and metadata file 145.

Application server 110 may be a server, a laptop, or other computer capable of supporting one or more applications. Applications may include, for example, Microsoft Sharepoint™, KnowledgeTree™, Documentum™, other document management applications, file sharing applications, blogs, collaboration tools, workgroup applications, portal applications, and other applications enabling the creation of data objects. Application server 110 may enable a user to create one or more data objects such as, for example, a document, a list, an image file, an email, a posting, a web page, xml data, a sound file, a video file, or other data objects. Application server 110 may utilize platforms or storage mechanisms such as databases or file systems which may utilize storage 120.

Storage 120 may be local, remote, or a combination thereof to application server 110. Storage 120 may utilize a redundant array of inexpensive disks (RAID), a redundant array of inexpensive nodes (RAIN), tape, disk, a storage area network (SAN), or other computer accessible storage. Storage 120 may contain system data 125 and application data 130.

System data 125 may contain metadata about one or more applications hosted by application server 110. System data 125 may include one or more structures or resources for determining metadata and/or application interfaces such as, for example, one or more file directories, system tables, universal modeling language diagrams, data definition language files, schema data, application programming interfaces, interface definitions, and web service description language (WSDL) data.

Application data 130 may include data written by one or more applications hosted by application server 110. Application data 130 may contain one or more user created application objects such as, for example, a document, a list, an image file, an email, a posting, a web page, xml data, a sound file, and a video file. Application data may be stored in one or more formats or data structures. Data structures may be determined by an underlying platform or system supporting an application. Data structures may not be representative of the application object. Data structures may make it difficult to determine the location, content and attributes of an application object. For example, a document management system may utilize a database to store one or more documents, lists, image files, emails, postings, web pages, xml data, sound files, video files, blog entries, or other application objects. The database may store the application object in tables, in character large objects (CLOBs), binary large objects (BLOBs), in hierarchical files, in flat files, object oriented structures, log files, and in other formats. Applications may use other platforms, such as portals or web application servers, which may utilize one or more tools and/or data structures for storage.

Recovery manager 115 may be a separate device, such as a server, from application server 110. In one or more embodiments, recovery manager 115 may be a process and may run on application server 110 or on one or more additional servers or devices. Recovery manager 115 may discover metadata for one or more applications hosted by application server 110. Metadata may enable recovery manager 115 to determine the location, content and one or more attributes of an application object within a data file. Metadata may enable recovery manager 115 to determine location, content, and one or more attributes of an application object within a backup or a copy of a data file such as backup data 140. Metadata may include one or more portions of table structures, table ids, object ids, file names, file structures, indexes, class diagrams, interface requirements, and application programming interface requirements. Metadata may enable recovery manager 115 to provide information to a user interface, such as a graphical user interface, for navigation of backed up or stored data, presentation of backed up or stored data to a user, and restoration of backed up or stored data. Metadata may enable a user interface to present backed up data in a format or layout familiar to users of an application. Metadata may enable a user interface to present one or more attributes of data objects which may enable an application user to understand the content, date, creator, user, type, or other aspect of the data. For example, an application may store data in a relational database, an object oriented database, a hierarchical database, a flat file, a compressed file, an encrypted file, in a proprietary or application specific format, or in a format which may not be easily comprehensible to an end user.

An end user, who accidentally deletes a calendar, a blog posting, a document or another application specific object, may only know the name of the application object and an approximate date range in which the application object existed. Knowing only an approximate date range and a document name, for example, it would be very difficult to tell what data to restore if the application stores its data in one or more tables of a relational database. An application may, for example, store a document in a character large object binary (CLOG) file which may be associated with a database table or stored within a database table. Finding this document may traditionally require a system administrator to restore an entire database to a point in time known to be prior to a document's deletion. After the restoration of the full database, an administrator may have to start a copy of the application to search through restored data to copy the document. Such a restoration may require significant space, time, and effort. It may require a separate server, significant disk space, and many hours.

Metadata may enable a user or an administrator to identify an application object in backed up or stored data. Recovery manager 115 may then restore the one or more objects desired. Recovery manager 115 may also perform a full restoration to a point in time and may enable an administrator to know for certain that the correct version of the one or more data objects desired exists at that point in time. Recovery manager 115 may also use application metadata to enable the granular restoration of application data, such as the restoration of one or more application objects.

Recovery manager 115 may also utilize metadata to gain information about an application programming interface (API) of an application that may be useful for the location of and/or restoration of one or more application data objects. For example, recovery manager 115 may gather metadata about one or more application programming interfaces, stored procedures, interface tables, or web services. Recovery manager 115 may utilize service brokers, object request brokers, universal description discovery and integration (UDDI) nodes or other resources to determine one or more APIs or other interfaces for extracting application objects, locating application objects, and/or restoring application objects. In one or more embodiments, recovery manager 115 may be programmed to use one or more APIs or interfaces for extracting application objects, locating application objects, and/or restoring application objects, and may not have to gather metadata about interfaces or APIs.

Recovery manager 115 may utilize one or more native methods for the restoration of data including an application programming interface, a stored procedure, an interface table, and/or a web service. The utilization of methods native to an application for restoration of one or more application objects may enable recovery manager 115 to ensure compatibility of restored data with an application. For example, a user may backup one or more application objects and the objects may be stored in a format of a lower level platform of the application such as a database. A restoration of the data by simply reinserting rows of data into the current database may not ensure compatibility with the application. The application may have been upgraded or modified subsequent to the backup and an insertion of data at the table level may not enable a user of an application utilizing the database to access the desired restored application object. Additionally, the application may have other dependencies in the data which can not be easily addressed through a lower level restoration. Recovery manager 115 may utilize application native methods, such as APIs, stored procedures, web services or other interfaces to restore the one or more desired application objects. The use of native application methods may enable recovery manager 115 to ensure greater recovery speed, data integrity, application integrity and/or system performance. In some embodiments, native application methods may be application proprietary methods, open interfaces, industry standards, or published standards.

In one or more embodiments, recovery manager 115 may gather metadata about application objects and APIs or interfaces prior to backup or storage of application data. In one or more embodiments, recovery manager 115 may gather metadata about application objects and APIs or interfaces after backup or storage of data but prior to restoration of the data. For example, recovery manager 115 may gather metadata from an existing system hosting an application. Recovery manager 115 may then apply that metadata information about APIs, application tables, schema, table ids, indexes, and other application structural information to recover the data from one or more log files or backups associated with a second system hosting the application.

In one or more embodiments, recovery manager 115 may gather metadata prior to backup and may store metadata in one or more backup files. In some embodiments, recovery manager 115 may store metadata prior to backup and may store the metadata in a file separate from the backup files. Metadata may be stored in one or more formats including text, XML, in a database importable format, or in other formats accessible by recovery manager 115.

Figure 2:
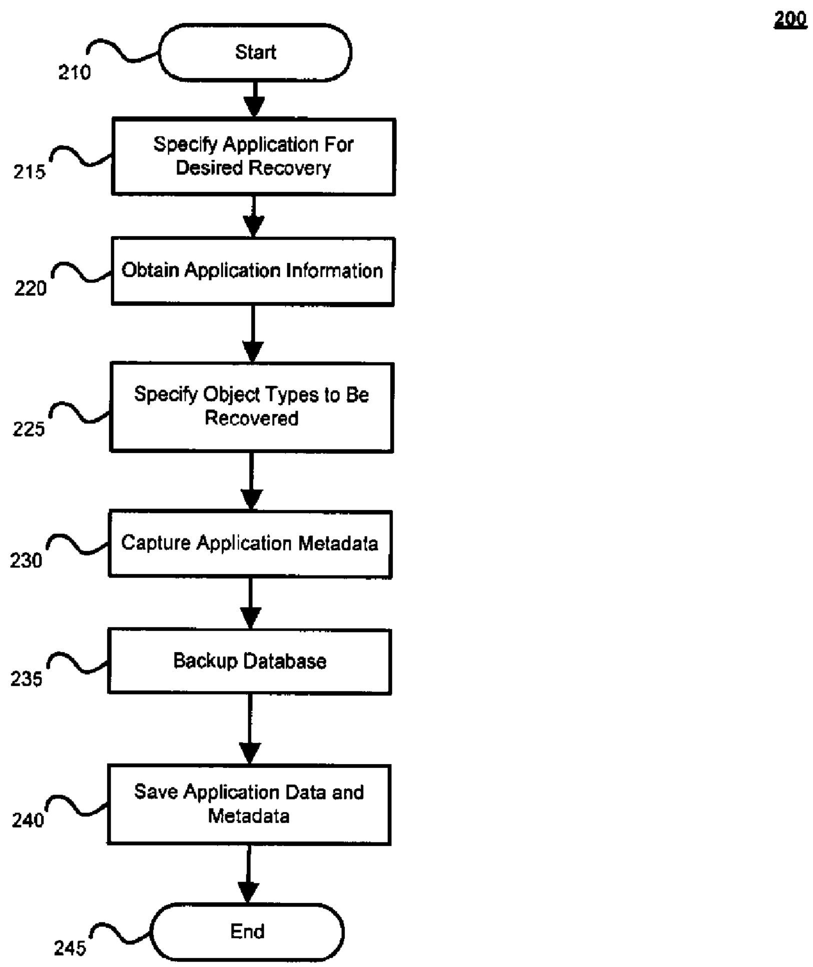
FIG. 2 shows a method for storing data to enable the recovery of application objects in accordance with an embodiment of the present disclosure.

Referring to FIG. 2, there is shown a method 200 for storing data to enable the recovery of application objects in accordance with an embodiment of the present disclosure. At block 210 the method 200 for storing data to enable the recovery of application objects may begin.

At block 215, a user of the method or a system utilizing the method may specify one or more applications for which objects will be recovered. In some embodiments, a user may be prompted to specify or choose an application. In some embodiments, the method 200 may determine an application from other information provided by a user. The method 200 may support only one application type or may be automated to determine the application type and may skip this portion of the method 200.

At block 220, the method 200 may gather application information. This may include application location such as host name, network address, storage location, application down times, backup schedules, versions, and other information.

At block 225, a user may specify object types to be recovered. This may be specified by desired object types, date ranges, file ownership, data location, or other information which may enable recovery manager to determine which data needs to be backed up.

At block 230, the method 200 may capture application metadata. This may include metadata which may be used to restore application data or application objects. Application metadata may also include information about application APIs, interfaces, or other information which may be used during recovery for extracting application objects, locating application objects, and/or restoring application objects. In some embodiments, metadata may be gathered prior to backup. Metadata may also be gathered during or after backup, such as when restoration of an application object is requested. The gathering of metadata may include all metadata for known applications on one or more hosts, metadata for a particular application on a host, metadata tailored to support restoration of requested application object types, and/or metadata created or edited within a certain date range.

At block 235, application data may be backed up or stored. This may be a database backup, a file system backup, or another method of ensuring data recovery.

At block 240, application data and metadata may be stored. Application data and metadata may be stored in one or more files and may be stored separately from or combined with each other. In some embodiments, application data may be stored and metadata may be gathered or discovered prior to restoration of application data.

At block 245, the method 200 may end.

Figure 3:
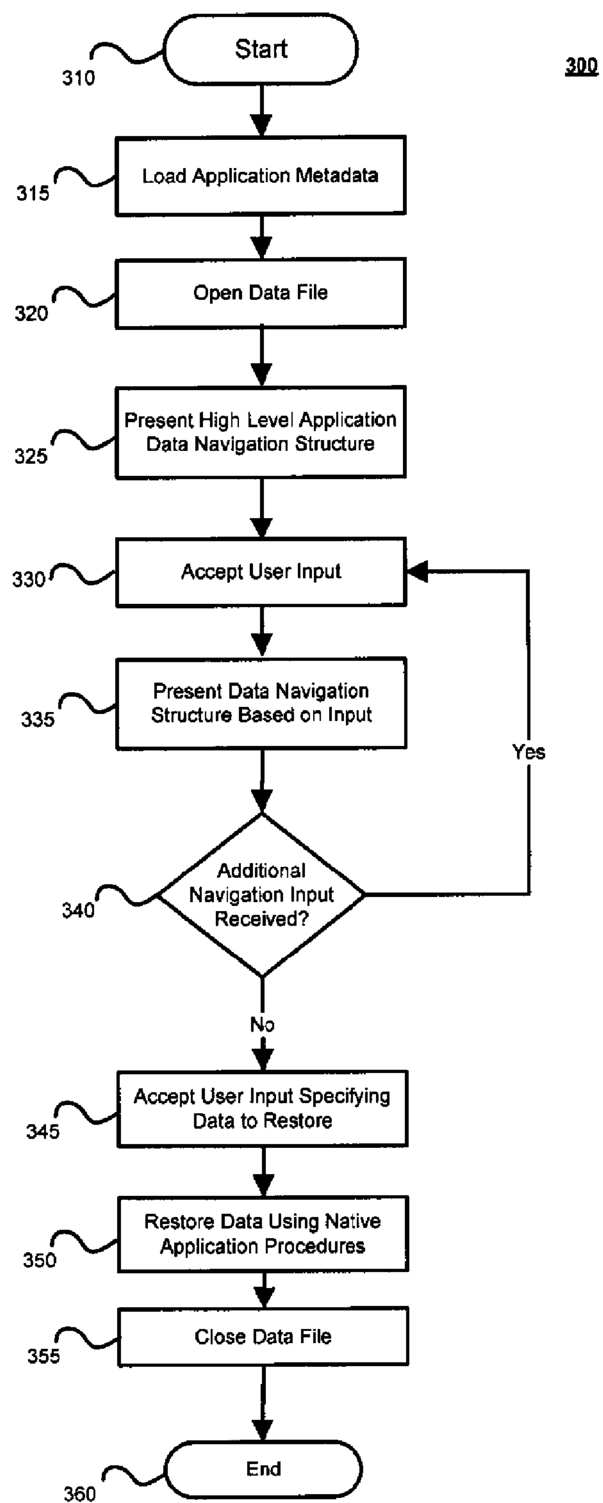
FIG. 3 shows a method for the recovery of application objects in accordance with an embodiment of the present disclosure.

Referring to FIG. 3, there is shown a method 300 for the recovery of application objects in accordance with an embodiment of the present disclosure. At block 310, the method 300 for the recovery of application objects may begin.

At block 315, a recovery or restoration process may load application metadata. In some embodiments, it may load application metadata from one or more files. In some embodiments, it may gather application metadata in response to a request to restore application data.

At block 320, a recovery or restoration process may open a data file and/or otherwise access stored application data. Data files may include log files, text files, compressed files, archived files, cached files, or other stored or backed up application data formats. Data files may reside on one or more storage devices such as disk, tape, storage area networks or other computer accessible storage. Data may be stored local to or remote from a recovery or restoration process.

At block 325, a recovery or restoration process may provide a user interface presenting application data available for restoration. The recovery or restoration process may present a high level application data navigation structure to a user. This may be done through a graphical user interface, a voice response unit (VRU), a printout, or other interfaces. The navigation structure may present a tree structure enabling a user to navigate a backed up file system, a search interface, a list, or other interface facilitating user navigation. The interface may enable searching, filtering, printing, and other actions.

At block 330, the interface may accept input from one or more users. For example, an interface may enable a user to double-click, choose from a menu, drill down, or otherwise specify navigation within the interface.

At block 335, the user interface may present new information to one or more users based on input received from the one or more users. For example, a display of a GUI may be refreshed to show a next level down of a backed up file system. The new information the user interface presents may reflect search results from a user query, results from a file or object filter specified by a user, results from a sort, or additional navigational information provided in response to input received from a user. As an additional example, a display may be refreshed to present additional object attributes specified by a user. A user interface may display a file or object name, creator and creation date, or other combination of attributes by default. In response to input from a user, a display may be refreshed to show file types, sizes, editing dates, directories, extensions, summaries, key words, file versions, deletion dates, permissions, or other attributes.

At block 340, the method 300 may detect user input received and may determine whether additional navigation input has been received from a user. If so, the method 300 may continue at block 330. If additional navigation input has not been received the method may proceed to block 345.

At block 345, the method 300 may accept user input received specifying one or more portions of application data to recover. A user may specify this by typing in an application object name in a text field and pressing enter in response to a prompt. A user may also double click on one or more portions of desired application data, select one or more portions via a menu, or specify one or more portions via a voice response unit.

At block 350, a recovery or restoration process of method 300 may restore one or more portions of specified data. Data may be restored using native application procedures such as APIs, stored procedures of an application, web services, or other interfaces. Native application procedures may enable application data to be recovered from a backup and restored to a current or production copy of an application. In some embodiments, data may be restored using methods which are not native or not application specific, such as file copies or database inserts of data to be restored.

At block 355, a data file, such as a database log may be closed and/or unlocked. In some embodiments, the backup or storage mechanism for the application data may not require this.

At block 360, the method 300 may end.

Figure 4:
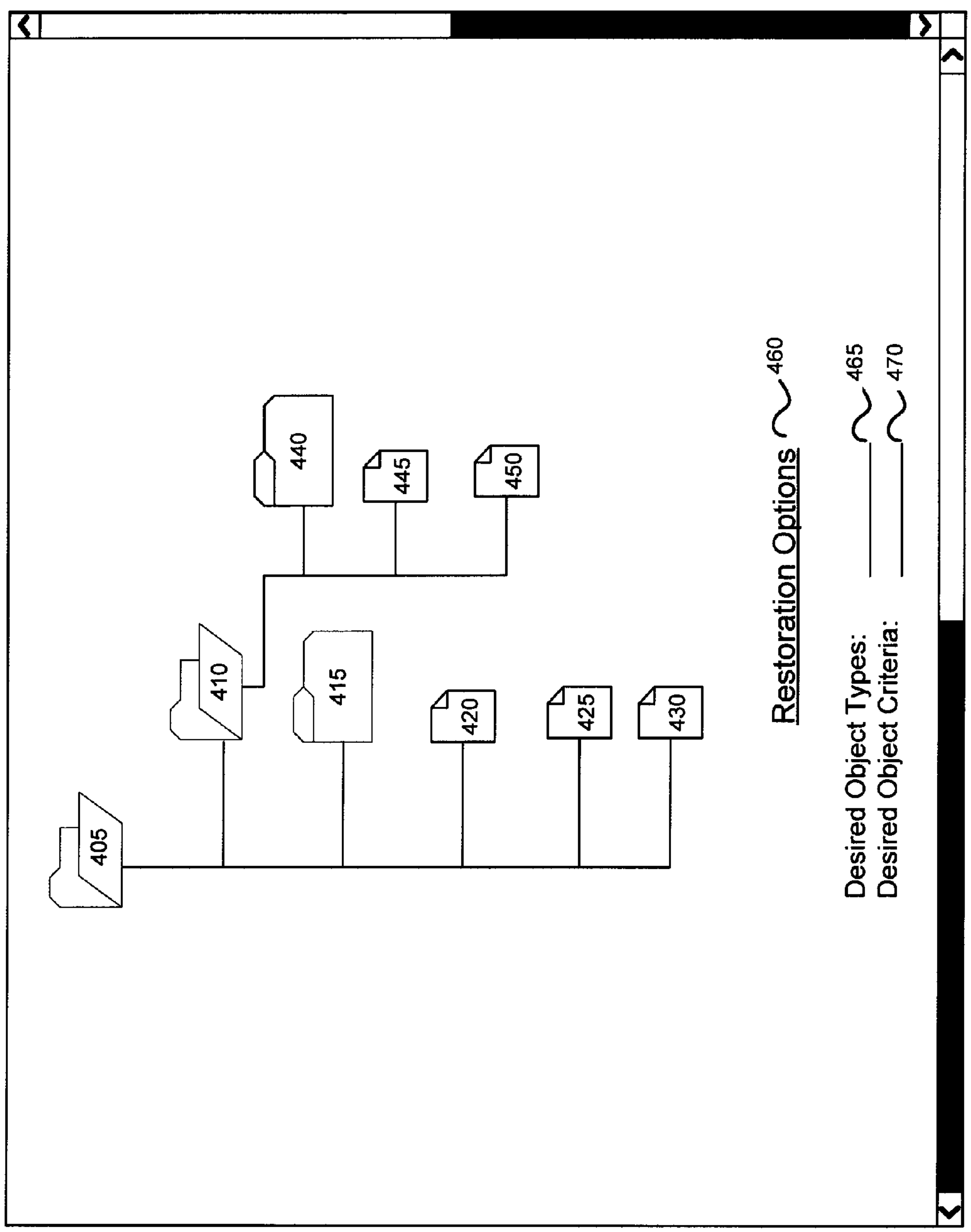
FIG. 4 depicts an user interface for the recovery of application objects in accordance with an embodiment of the present disclosure.

Referring to FIG. 4, there is shown an user interface 400 for the recovery of application objects in accordance with an embodiment of the present disclosure. The user interface 400 for application object restoration may enable a user to navigate application objects available for restoration by providing a graphical user interface enabling a user to drill down into one or more application data structures, a query capability, and/or one or more filters for limiting available restoration objects presented to a user. Additionally, the user interface 400 may utilize hyperlinks, lists, menus, buttons, and other graphical user interface controls and display elements. Display element 405 may be a top level directory icon or folder. It may represent the top of a file structure by storage device, drive, or path. It may also represent the top of a user directory, and/or the resulting display categorization of a sort request or a search request. A user may click, double-click, mouse over, select, or otherwise indicate the opening of display element 405. In some embodiments, a display or navigation path may be presented fully or partially expanded or opened. Logically presented within or beneath display element 405 may be display elements 410, 415, 420, 425, 430, 440, 445, and 450. Display elements 410, 415, and 440 may represent directories, folders, or other icons indicating to a user that the icon may be contain one or more logical sublevels. Display elements 420, 425, 445 and 450 may represent application data objects available for restoration. In one or more embodiments, users of user interface 400 may restore one or more directories or folders. Display elements may display file or object names, object creators and object creation date, or other combinations of attributes by default. In response to input from a user, a display may be refreshed to show file types, sizes, editing dates, directories, extensions, summaries, key words, file versions, deletion dates, permissions, or other attributes. Display elements may utilize one or more icons or other GUI attributes to indicate file or application type or other information to a user. A user may specify desired objects to restore by selecting the objects with a mouse, double-clicking on an object, utilizing a menu choice, hitting a function key, or providing other input. A user may select one or more display objects including files and/or directories.

User interface 400 may also contain one or more options such as restoration options 460. Restoration options 460 may contain hyperlinks, lists, menus, buttons, and other control or display elements. Input 465 may enable a user to type in desired application object types and may refresh user interface 400 to display only those object types and/or directories containing those object types. For example, a user may utilize input 465 to filter user interface 400 to display only documents. Input 470 may enable a user to enter additional object criteria, such as a key word, a file name, a creator, a directory, a file date, a file size, a network address of a directory, IP address of a directory, or other file or directory attributes. Additionally, restoration options 460 may contain other inputs or controls which provide one or more users with data search, display, sort, filter, or restoration options. A user may, for example, specify a network name and directory structure as a restoration target. This may be network accessible to a restoration process associated with user interface 400, and user interface 400 may place the one or more restored application data objects there. A user may also use restoration options 460 to specify a host, database name, application instance name, domain name, or other location information to specify a data store of an application to which one or more application data objects and/or directories are to be restored. For example, a user may specify a domain name and an instance name of a production application in order to restore selected application data objects to the production application. Additionally, a user may specify other options for delivery of restored data including an email address, an FTP address and directory, a printer name for a print out, a blog or resource description framework site summary (RSS) feed for posting, or other electronic transmission addresses.

At this point it should be noted that recovery of application level objects in accordance with the present disclosure as described above typically involves the processing of input data and the generation of output data to some extent. This input data processing and output data generation may be implemented in hardware or software. For example, specific electronic components may be employed in an application specific integrated circuit or similar or related circuitry for implementing the functions associated with recovery of application level objects in accordance with the present disclosure as described above. Alternatively, one or more processors operating in accordance with stored instructions may implement the functions associated with recovery of application level objects in accordance with the present disclosure as described above. If such is the case, it is within the scope of the present disclosure that such instructions may be stored on one or more processor readable carriers (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for restoration of an application level object comprising:

obtaining application metadata of an application containing objects to be restored, wherein the application metadata provides application structure information facilitating access of application data;

storing at least one data file containing application data;

utilizing the application metadata to provide a user interface for restoring an application level object, wherein the user interface for restoring an application level object is configured to allow a user to navigate application level objects available for restoration by providing a graphical user interface allowing a user to drill down into one or more application data structures, wherein information about application level objects available for restoration within an application data structure is obtained using the application metadata;

accepting input from a user via the user interface specifying an application level object to restore, wherein the application level object comprises one or more portions of the at least one data file; and restoring the specified application level object using the application metadata.

2. The method of claim 1, wherein application metadata is obtained prior to storing the at least one data file containing application data.

3. The method of claim 1, wherein application metadata is obtained prior to utilizing the application metadata for the restoration of an application level object.

4. The method of claim 1, wherein the user interface for restoring an application level object further comprises at least one of: a query capability, one or more filters for limiting available restoration objects presented to a user, hyperlinks, lists, menus, and buttons.

5. The method of claim 1, wherein the restoration of the specified application level object utilizes one or more methods native to the application.

6. The method of claim 5, wherein the one or more native methods include at least one of: an application programming interface, a stored procedure, an interface table, and a web service.

7. The method of claim 1, wherein obtaining application metadata comprises obtaining information related to at least one of: table structures, table ids, object ids, file names, file structures, indexes, class diagrams, interface requirements, and application programming interface requirements.

8. The method of claim 1, wherein application metadata is obtained utilizing at least one of: a file directory, a system table, a universal modeling language diagram, a data definition language file, schema data, an application programming interface, an interface definition, web service description language data, a service broker, an object request broker, and universal description discovery and integration.

9. The method of claim 2, further comprising storing one or more files containing the application metadata.

10. The method of claim 9, wherein the application metadata and the application data are stored in the same file.

11. The method of claim 1 wherein objects to be restored comprise at least one of:

a document, a list, an image file, an email, a posting, a web page, xml data, a sound file, and a video file.

12. A non-transitory computer readable storage medium storing a computer program of instructions configured to be readable by at least one processor for instructing the at least one processor to execute a computer process for performing the method as recited in claim 1.

13. An article of manufacture for restoration of an application level object, the article of manufacture comprising:

at least one non-transitory computer readable storage medium; and instructions stored on the at least one non-transitory computer readable storage medium;

wherein the instructions are configured to be readable from the at least one non-transitory computer readable storage medium by at least one processor and thereby cause the at least one processor to operate so as to:

obtain application metadata of an application containing objects to be restored, wherein the application metadata provides application structure information facilitating access of application data;

store at least one data file containing application data;

utilize the application metadata to provide a user interface for the restoration of an application level object, wherein the user interface for restoring an application level object is configured to allow a user to navigate application level objects available for restoration by providing a graphical user interface allowing a user to drill down into one or more application data structures, wherein information about application level objects available for restoration within an application data structure is obtained using the application metadata;

accept input from a user via the user interface specifying an application level object to restore, wherein the application level object comprises one or more portions of the at least one data file; and restore the specified application level object using application metadata.

14. A system for restoration of an application level object comprising:

one or more processors communicatively coupled to a server; wherein the server is configured to:

obtain application metadata of an application containing objects to be restored, wherein the application metadata provides application structure information facilitating access of application data;

store at least one data file containing application data;

utilize the application metadata to provide a user interface for the restoration of an application level object, wherein the user interface for restoring an application level object is configured to allow a user to navigate application level objects available for restoration by providing a graphical user interface allowing a user to drill down into one or more application data structures, wherein information about application level objects available for restoration within an application data structure is obtained using the application metadata;

accept input from a user via the user interface specifying an application level object to restore, wherein the application level object comprises one or more portions of the at least one data file; and restore the specified application level object.

15. The system of claim 14, wherein the server is configured to obtain the application metadata prior to storing the at least one data file containing application data.

16. The system of claim 14, wherein the server is configured to obtain the application metadata prior to utilizing the application metadata for the restoration of an application level object.

17. The system of claim 14, wherein the user interface for restoring an application level object further comprises at least one of: a query capability, one or more filters for limiting available restoration objects presented to a user, hyperlinks, lists, menus, and buttons.

18. The system of claim 14, wherein the server is configured to restore the specified application level object by utilizing one or more methods native to the application.

19. The system of claim 14, wherein the application metadata enables a server to restore the specified application level object by enabling the server to determine one or more portions of data necessary for the specified application level object.

20. The system of claim 14, wherein the server is configured to obtain application metadata by obtaining information related to at least one of: a table structure, a table id, an object id, a file name, a file structure, an index, a class diagram, an interface requirement, and an application programming interface requirement.

* * * * *